(12) United States Patent
Peters (10) Patent No.: US 9,283,635 B2
(45) Date of Patent: Mar. 15, 2016

(54) SYNCHRONIZED HYBRID GAS METAL ARC WELDING WITH TIG/PLASMA WELDING

(75) Inventor: Steven R Peters, Huntsburg, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 469 days.

(21) Appl. No.: 13/411,393

(22) Filed: Mar. 2, 2012

(65) Prior Publication Data

US 2013/0228555 A1 Sep. 5, 2013

(51) Int. Cl.
| | |
|---|---|
| *B23K 9/00* | (2006.01) |
| *B23K 9/10* | (2006.01) |
| *B23K 9/167* | (2006.01) |
| *B23K 9/09* | (2006.01) |
| *B23K 9/173* | (2006.01) |

(52) U.S. Cl.
CPC .............. *B23K 9/1675* (2013.01); *B23K 9/092* (2013.01); *B23K 9/1735* (2013.01)

(58) Field of Classification Search
CPC .... B23K 9/1675; B23K 9/167; B23K 9/0673; B23K 9/0738; B23K 9/0678; B23K 9/0672; B23K 9/067; B23K 9/0676; B23K 9/073
USPC ................. 219/137.7, 137 PS, 137.2, 130.21, 219/130.31, 130.32, 130.33, 130.4, 130.5, 219/130.51, 130.1
See application file for complete search history.

(56) References Cited

U.S. PATENT DOCUMENTS

| | | | | |
|---|---|---|---|---|
| 4,366,362 | A | * | 12/1982 | Ohta et al. ..................... 219/123 |
| 4,464,558 | A | * | 8/1984 | Mizuno et al. ............ 219/130.21 |
| 4,904,843 | A | * | 2/1990 | Hori et al. ................ 219/137 PS |
| 5,416,299 | A | | 5/1995 | Tabata et al. |
| 6,693,252 | B2 | * | 2/2004 | Zhang et al. ............. 219/121.45 |
| 7,495,193 | B2 | * | 2/2009 | Myers et al. .............. 219/130.51 |
| 2006/0207983 | A1 | | 9/2006 | Myers et al. |
| 2007/0158324 | A1 | * | 7/2007 | O'Donnell et al. ....... 219/137.71 |
| 2008/0006612 | A1 | | 1/2008 | Peters et al. |
| 2008/0011727 | A1 | * | 1/2008 | Peters ......................... 219/130.5 |
| 2008/0264923 | A1 | * | 10/2008 | White ...................... 219/137 PS |
| 2010/0176109 | A1 | * | 7/2010 | Peters ....................... 219/137.61 |
| 2011/0168676 | A1 | * | 7/2011 | Peters ........................... 219/73.1 |
| 2013/0200054 | A1 | * | 8/2013 | O'Donnell et al. ......... 219/130.1 |

FOREIGN PATENT DOCUMENTS

| | | | | |
|---|---|---|---|---|
| CN | 101808772 A | | 8/2008 | |
| JP | 56111576 A | * | 9/1981 | ............... B23K 9/09 |
| JP | 57022877 A | * | 2/1982 | ............... B23K 9/08 |
| JP | 57036070 A | * | 2/1982 | ............... B23K 9/00 |

(Continued)

OTHER PUBLICATIONS

Int'l Application No. PCT/IB2013/000373; Written Opinion; (Jul. 12, 2013); pp. 1-4.
Int'l Application No. PCT/IB2013/000373; ISR; (Jul. 12, 2013); pp. 1-4.
Chinese Office Action for CN 201380011831.2; May 11, 2015, pp. 1-11.

*Primary Examiner* — Tu B Hoang
*Assistant Examiner* — Alba Rosario-Aponte
(74) *Attorney, Agent, or Firm* — Perkins Coie LLP (57) ABSTRACT

A system and method is provided in which each of a GMAW power supply and a TIG/plasma power supply are utilized in a common weld joint, where the waveforms from each of the power supplies are pulsed waveform which are pulsed out of phase which each other. Such a system minimizes arc interference and arc blow while at the same time increasing travel speed and throughput of a welding operation.

20 Claims, 8 Drawing Sheets

(56) References Cited

FOREIGN PATENT DOCUMENTS

| | | | | |
|---|---|---|---|---|
| JP | 58055174 A | * | 4/1983 | ............ B23K 9/06 |
| JP | 58184069 A | * | 10/1983 | ............ B23K 9/08 |
| JP | 2008207213 A | * | 9/2008 | |
| JP | 2008207213 | | 11/2008 | |
| WO | WO 2004/043639 A1 | | 5/2004 | |

* cited by examiner

SYNCHRONIZED HYBRID GAS METAL ARC WELDING WITH TIG/PLASMA WELDING

BACKGROUND OF THE INVENTION

1. Field of the Invention

Systems and methods of the present invention relate to welding and joining, and more specifically to synchronized hybrid gas metal arc welding with TIG/plasma welding.

2. Description of the Related Art

As advancements in welding have occurred, the demands on welding throughput have increased. Because of this, various systems have been developed to increase the speed of welding operations, including systems which use multiple welding power supplies that direct their respective welding currents to the same welding operation. While these systems can increase the speed or deposition rate of a welding operation, the different welding arcs, created by the multiple power supplies, can interfere with each other causing arc blow and other problems during welding. One method to address the arc interference is through the use of magnets. However, such systems are problematic to operate and set up. Thus, improved systems are desired.

BRIEF SUMMARY OF THE INVENTION

Exemplary embodiments of the present invention include a welding system and method of welding having a welding power supply which outputs a pulsed welding waveform to melt an electrode into a weld joint, where the pulsed welding waveform has a plurality of peak current portions and a plurality of background current portions. The system also has a heat generation power supply which outputs a pulsed heating signal to melt at least a portion of the weld joint, where the pulsed heating signal has a plurality of peak current portions and a plurality of non-peak current portions. At least one of the welding power supply and the heat generation power supply are controlled such that the pulsed heating signal is out-of-phase with the pulse welding waveform such that each of the peak current portions of the pulsed heating signal do not occur during the peak current portions of the pulsed welding waveform.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1:
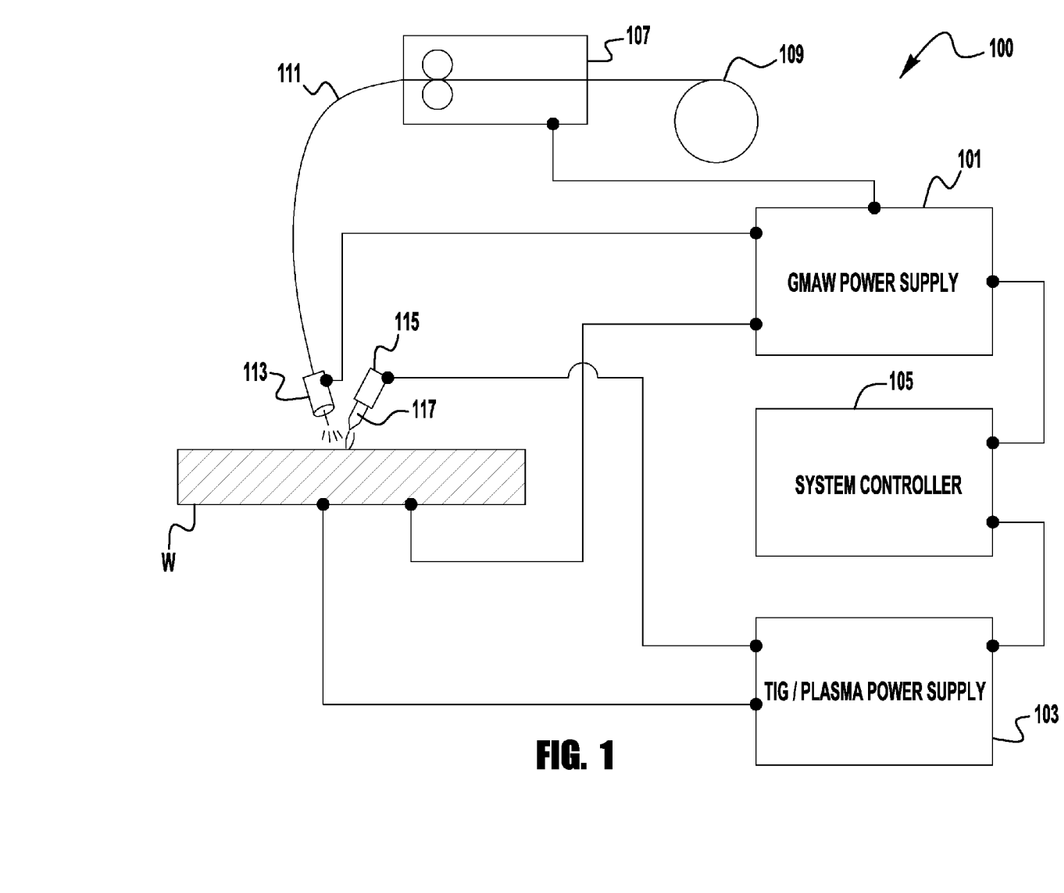
FIG. 1 is a diagrammatical representation of an exemplary embodiment of a welding system according to the present invention.

FIG. 1 depicts a welding system 100 in accordance with an exemplary embodiment of the present invention. The system 100 contains a GMAW welding power supply 101 and a TIG/plasma power supply 103. The GMAW power supply 101 can be any type of welding power supply that is capable of performing a gas metal arc welding operation. Alternatively, the GMAW power supply 101 can also be a FCAW or MCAW welding power supply and not depart from the spirit and scope of the present invention. The reference herein to "power supply" or "GMAW power supply" is intended to include these other types of power supplies or power supplies capable of performing all, some or any one of these types of welding operations, including other types of welding operations that can be used in accordance with embodiments of the present invention. The TIG/plasma power supply 103 can be any type of power supply that generates a plasma or arc between a non-consumable contact tip 117 and a work piece W. Such power supplies are generally known and need not be described in detail herein.

The GMAW power supply 101 is coupled, via a lead, to a wire feeding mechanism 107 which feeds a filler wire/electrode 111 from a source 109 to a welding torch 113 to weld the work piece W. The welding current from the power supply 101 is passed to the torch 113 from the wire feeding mechanism 107 via a lead (not shown). The power supply 101 provides a pulsed welding waveform to the torch to use the wire 111 to weld the work piece W. The pulsed waveform can either be a DC or AC pulse welding waveform, as either type can be used with embodiments of the present invention.

The system 100 also contains a system controller 105 which is coupled to each of the power supplies 101 and 103. The system controller 105 facilitates the communication between each of the power supplies 101 such that their respective current waveforms are controlled as further described below. In FIG. 1 the system controller 105 is shown as a separate component, but embodiments of the present invention are not limited in this regard as the system controller 105 can be made integral to the control electronics of one of the power supplies 101/103. Specifically, the system 100 can be configured in a master-slave relationship where one of the power supplies (for example the power supply 101) can be the master power supply to control the operation of the slave power supply (for example the TIG/plasma power supply 103). Master-slave relationships and configurations are generally known. An example of such a power supply is the Power Wave® AC/DC power supplies manufactured by The Lincoln Electric Company of Cleveland, Ohio. Of course, other types of power supplies can be utilized. Control of the welding process can be achieved in a number of ways. For example, the power supply 101 can communicate in real-time to the power supply 103 (directly or via the controller 105) the status of the welding waveform of the power supply 101, such as peak, background, etc. and based on that communicated information the power supply 103 controls its own waveform. In another exemplary embodiment, one of the power supplies (for example power supply 101) or the controller 105 utilizes a state table control methodology such that a parallel state table exists for the control of the TIG/plasma power supply 103. In such an embodiment, the state table of the GMAW power supply 101 controls the output of the power supply 101, using any needed feedback from the welding operation. That operational feedback is then also shared with the parallel state table controlling the operation of the power supply 103 such that the two state tables run parallel with each other and share resources, such as feedback, to control the respective power supplies.

In another exemplary embodiment of the present invention, the power supply 101 outputs a pulse logic when the welding output is at a determined level, such as background or peak and the operation of the power supply 103 is synched to the pulsed logic signal. For example, the plasma/TIG pulse can be synced with the pulsed logic signal to control the pulsing of the TIG/plasma pulse. In an exemplary embodiment, the pulsed logic signal can be output by a state table within the power supply 101 (or controller 105) and is used to synchronize a digital output bit flag that is controlled by the state table logic.

In a further exemplary embodiment, a signal generator is utilized (which can be an external signal generator or internal to any of the power supply 101, controller 105, or power supply 103) which is set to a desired pulse rate. Then the output of each of the power supply 101 and power supply 103 can be synchronized to that pulse rate. In another exemplary embodiment, the power supply 103 output can be synced at a delay (i.e., phase angle delay) from the synchronized pulse rate.

In yet a further embodiment, a state table can be utilized to control the output of the power supply 101 and a separate, parallel state table can be used to control the output of the power supply 103. The controller 105 can contain one or both of the state tables, or they can be stored in either, or both, of the power supplies 101 and 103. In such an embodiment, the output of each of the power supplies is controlled via the state tables, based on desired predetermined performance and response based on various input/feedback conditions.

Figure 4:
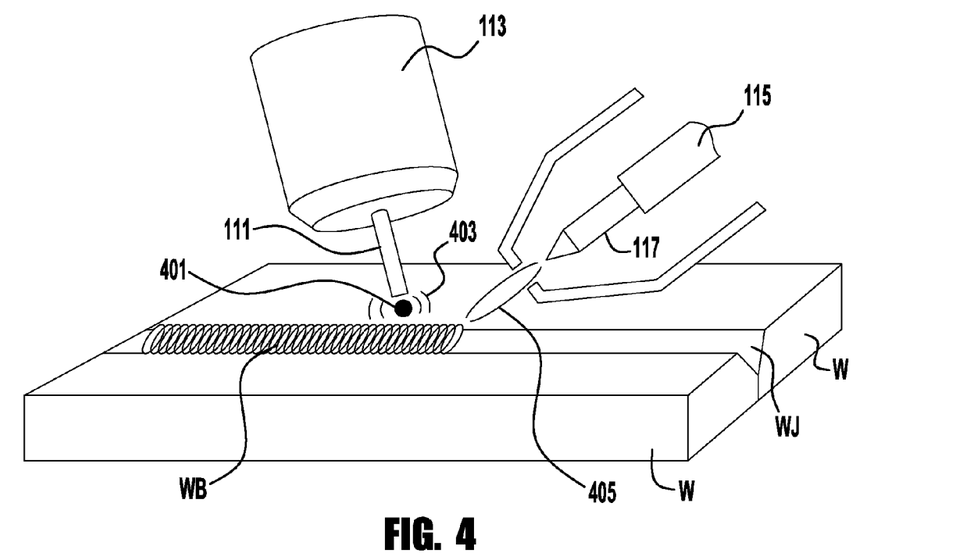
FIG. 4 is a diagrammatical representation of an exemplary welding operation of the present invention.

During welding, the torch 115 of the TIG/plasma power supply 103 is positioned adjacent to the torch 113 such that the welding torches 113 and 115 are operating in the same welding puddle. This is generally shown in FIG. 4, which will be discussed further below.

Also during welding, the TIG/plasma power supply 103 provides a pulsed waveform to the electrode 117, where the waveform for the electrode 117 is pulsed and synchronized with the welding waveform provided by the GMAW power supply 101. This is described further below.

Figure 2:
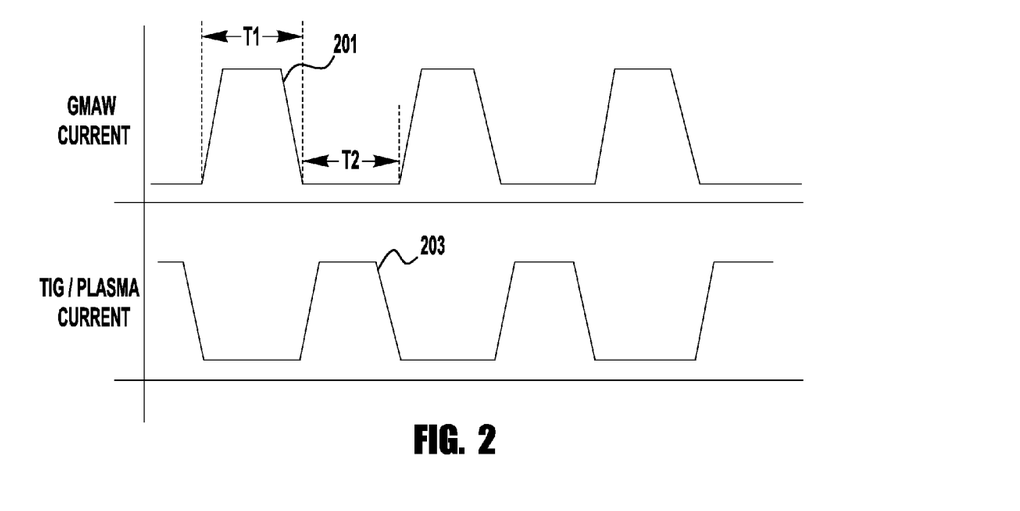
FIG. 2 is a diagrammatical representation of an exemplary welding waveform used in embodiments of the present invention.
Figure 3A:
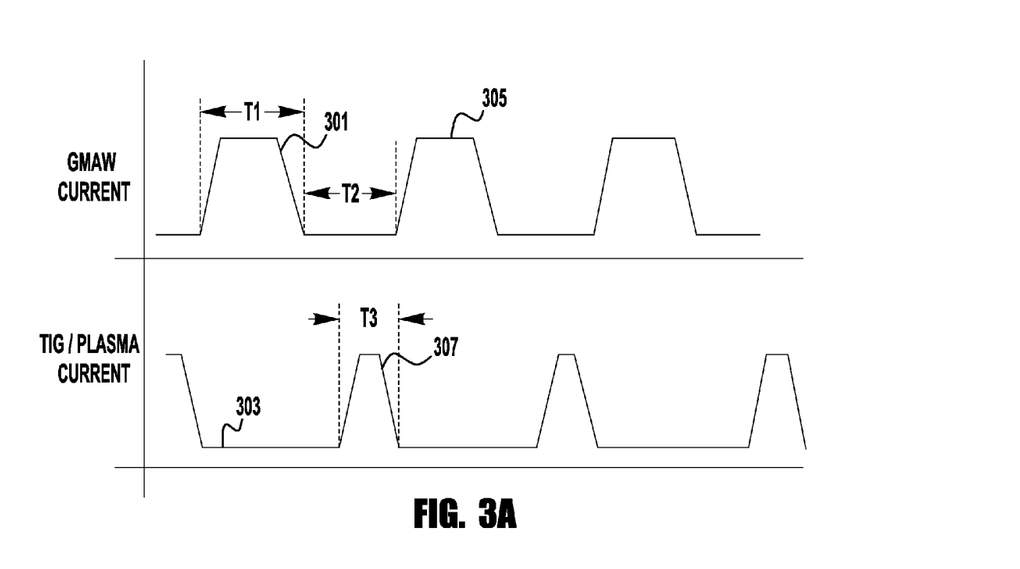
FIGS. 3A to 3E are diagrammatical representations of other exemplary welding waveforms used in embodiments of the present invention.
Figure 3B:
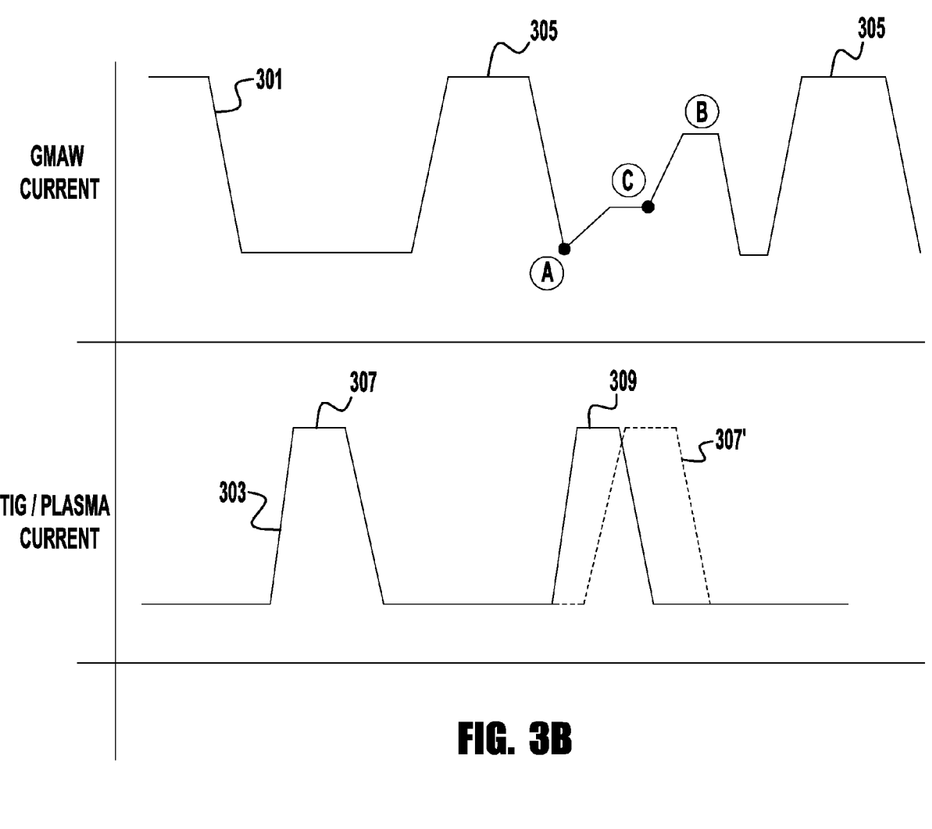

FIGS. 2 and 3A/B depict different welding waveforms used by exemplary embodiments of the present invention. FIG. 2 depicts a welding waveform 201 provided by the GMAW power supply 101 and a pulsed waveform 203 provided by the TIG/plasma power supply 103. The welding waveform 201 is a pulsed waveform having a peak and background current where the pulse current has a duration T1 and the background current is provided for a duration T2. The pulsed waveform 201 shown is a DC waveform, however an AC pulsed waveform can also be utilized. The pulsed TIG/plasma waveform 203 also has peak and background levels as shown, but the pulsed waveform 203 is out-of-phase with the welding waveform 201 such that while the welding waveform 201 is at a background current level the TIG/plasma waveform 203 is in a pulse, and vice-versa. Such synchronization ensures that there is minimal arc interference between the welding arc from the power supply 101 and the arc from the TIG/plasma power supply 103. This synchronization will minimize arc interference between the generated arcs without the need for magnetic steering between the arcs.

FIG. 3A depicts another exemplary embodiment of the present invention, where there is a similar welding waveform 301 to that shown in FIG. 2. However, unlike FIG. 2, the TIG/plasma pulsed waveform 303 does not have a pulse duration T3 which is the same duration as the background T2 of the waveform 301. Rather the pulse duration T3 is less than the background duration T2. Also, in the embodiment shown in FIG. 3 the pulse 305 from the power supply 101 begins at the end of the pulse 307 from the power supply 103. However, in other exemplary embodiments the pulse 307 from the TIG/plasma power supply 103 is positioned in the background time T2 of the waveform 301 such that the pulse 307 begins at the conclusion of the welding pulse 305. In yet further embodiments, the TIG/plasma pulse 307 is positioned in the background time T2 such that the pulse 307 begins and ends during the background duration T2 of the welding waveform.

FIG. 3B depicts a further exemplary embodiment of the present invention, where the TIG/plasma power supply 103 is used to aid in the clearing of a short circuit. This embodiment can be utilized in welding systems in which short circuits are not desirable, or in systems where short circuiting of the electrode 111 to the work piece W is a means of droplet transfer, such as in surface tension transfer (STT) welding operations. In FIG. 3B, the GMAW waveform 301 is similar to that shown in FIG. 3A where the current has pulses 305 to transfer a droplet from the electrode 111 to the weld puddle. Further, the TIG/plasma power supply 103 is providing a pulsed current 303 such that pulses 307 are timed while the GMAW current 301 is at a background level (that is, the pulse 307 begins and ends during the background of the waveform 301). However, at point A a short circuit is detected by the power supply 101 and/or the system controller 105. This detection is communicated, in real-time, to the power supply 103 such that a short clearing pulse 309 is initiated. This short clearing pulse 309 is used by the power supply 103 to aid in burning back or breaking the connection between the electrode 111 and the work piece W. Thus, even though the GMAW power supply 101 has a short clearing pulse B, the length of time and the power needed by the GMAW power supply 101 to clear the short can be reduced by the additional arc/plasma provided from the TIG/plasma power supply 103. In the embodiment shown, the short clearing pulse 309 is energized such that it ends when the GMAW current 301 begins its own short clearing pulse at C. This aids in preventing interference between the short clearing pulse B of the waveform 301 and the short clearing pulse 309 of the waveform 303. Also in the embodiment shown, because of the initiation of the short clearing pulse 309 by the power supply 103 the normal pulse 307'—which was the anticipated next pulse after pulse 307—is skipped by the power supply 103. Stated differently, because of the presence of the short clearing pulse 309 the power supply 103 temporarily halts its normal waveform 303 and cycle to deal with the short circuit, and then continues its normal waveform 303 and pulses 307 following the clearance of the short. In exemplary embodiments of the present invention, the short clearing pulse 309 has a current peak which is at least the same as the peak current for the normal pulse 307. In other embodiments, the peak current of the short clearing pulse 309 is higher than that of the normal pulse 307. In such embodiments, these currents levels for the short clearing pulses ensure that there is sufficient heat input to break the short circuit.

It should be noted that although some of the Figures of the present application, for example FIGS. 2, 3A and 3B, depict a TIG waveform as DC+, it is understood that TIG waveforms are typically DC− or AC. As such, the respective waveforms shown herein which show a DC+ signal for TIG welding should be considered DC−, but are illustrative of the waveform control of exemplary embodiments of the present invention.

Figure 3C:
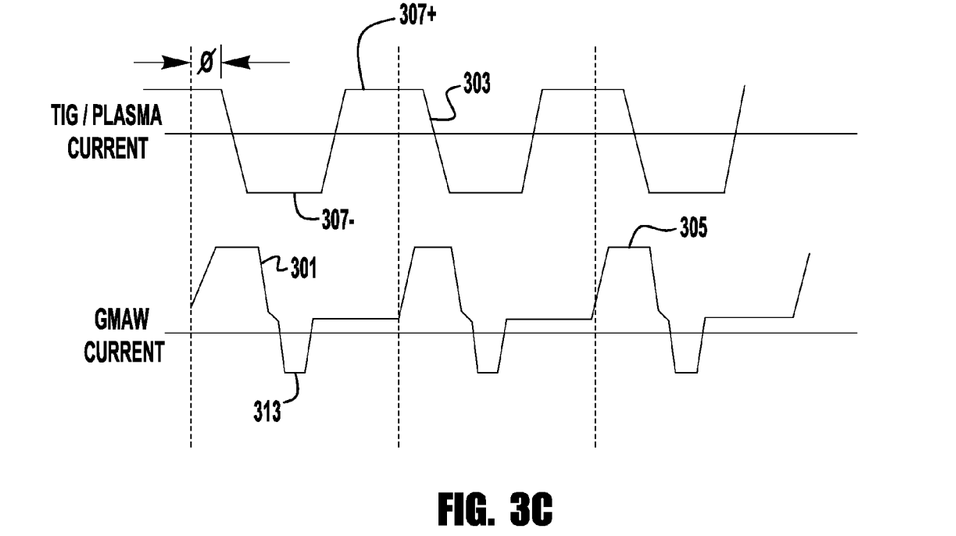

FIG. 3C is a further exemplary waveform that can be used in exemplary embodiments of the present invention. In this embodiment, each of the waveforms 301/303 is AC waveforms. As shown in this embodiment, the waveforms are synced such that the beginning of the pulse 305 of the GMAW waveform 301 begins during the positive peak 307+ of the TIG/plasma current waveform 303. In such an embodiment the TIG/plasma waveform 303 is offset by a phase angle Ø between the beginning of the pulse 305 and the end of the pulse 307+. In exemplary embodiments of the present invention, this phase angle Ø offset is in the range of 1 to 359 degrees, and in some exemplary embodiments this phase angle is in the range of 45 to 90 degrees. Additionally, in some exemplary embodiments, as shown in FIG. 3C, the entire duration of the negative GMAW pulse 313 occurs while the TIG/plasma waveform 303 is negative (e.g., during the negative pulse 307−). It is noted that in the embodiment shown in FIG. 3C the peak current of the negative pulse 307− has a duration such that it begins before the GMAW pulse 313 begins and ends after the pulse 313 ends. In this embodiment, by having the TIG/plasma current 303 at a peak level when the GMAW current changes polarity (at the zero current level), the arc from the TIG/plasma current 303 will aid in relighting or reigniting the GMAW arc as the polarity changes.

Figure 3D:
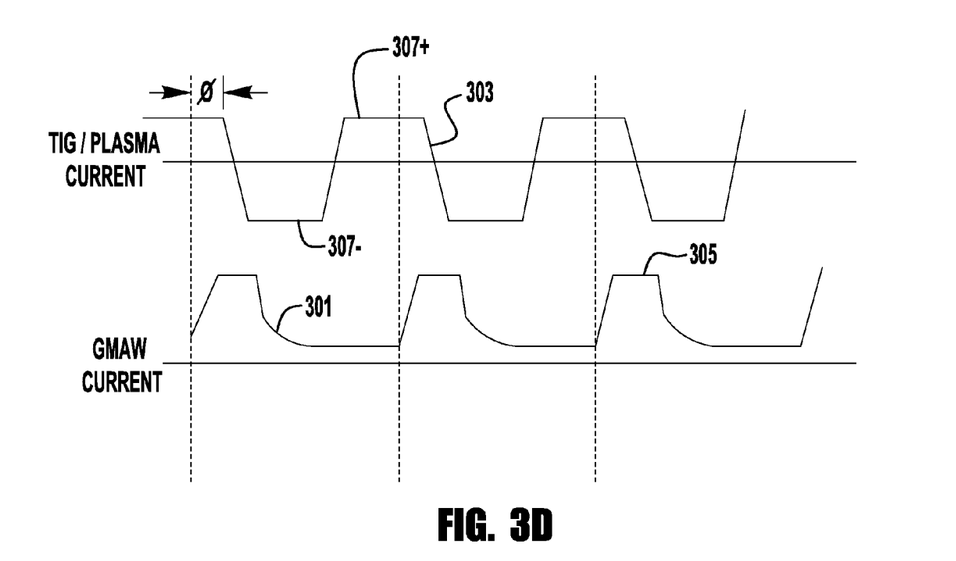

FIG. 3D depicts a further exemplary waveform, where the TIG/plasma waveform 303 is an AC waveform, but the GMAW waveform 301 is a DC waveform. Although this embodiment shows the waveform 301 as a DC+ waveform, in some embodiments it can be a DC− waveform. In exemplary embodiments of the present invention, the waveform 303 is offset from the waveform 301 by a phase angle Ø in the range of 0 to 90 degrees. As with FIG. 3C, the phase angle is measured between the beginning of the pulse 305 and the end of the positive pulse 307+ of the waveform 303.

Figure 3E:
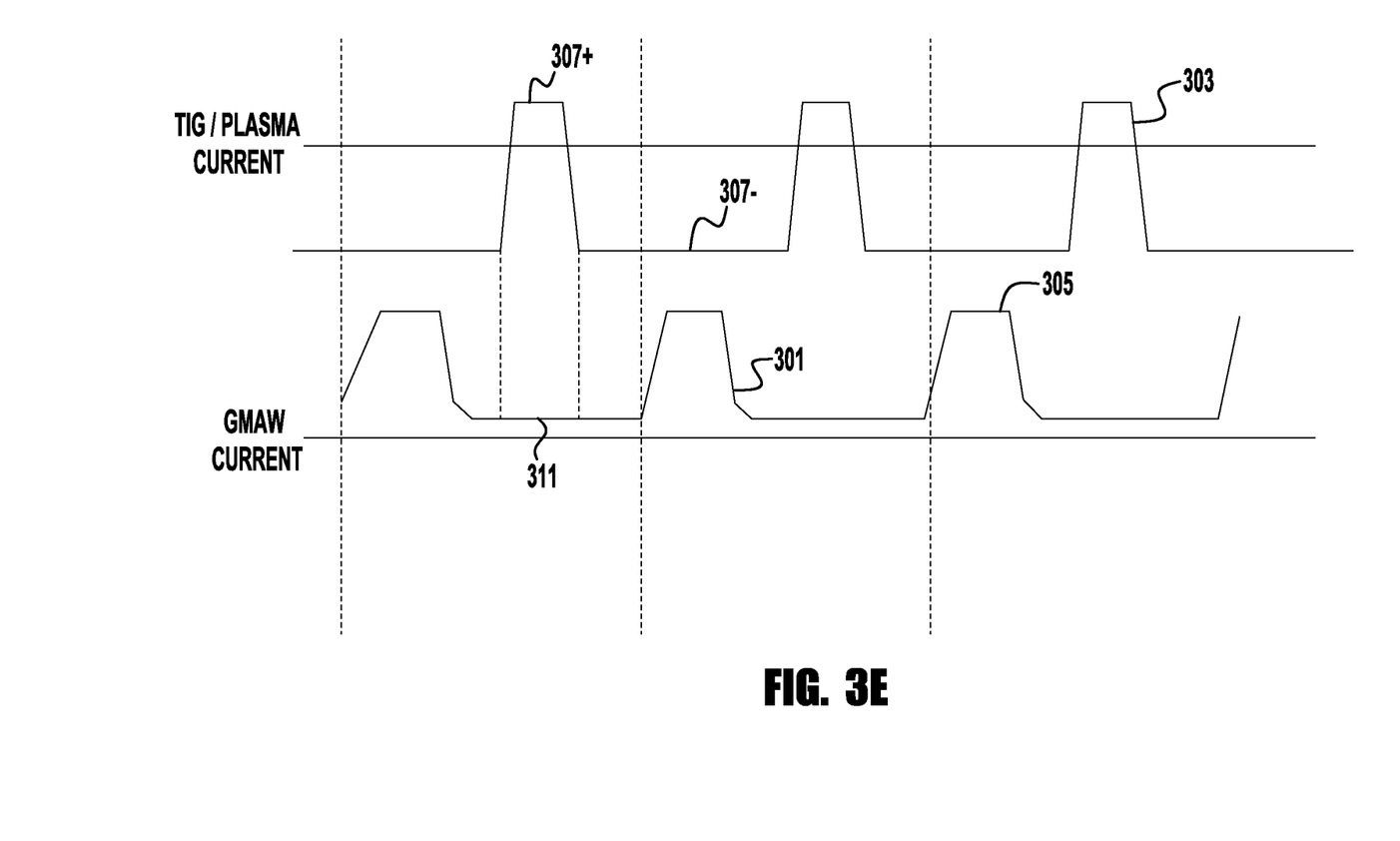

FIG. 3E depicts an additional exemplary waveform that can be used with embodiments of the present invention. In this embodiment, the TIG/plasma waveform 303 is an AC waveform which is controlled such that each transition point between the different polarities occurs during the background 311 of the GMAW waveform 301. In the embodiment shown in FIG. 3E, the waveform 303 is controlled such that the entire positive pulse 307+ occurs during the background 311. This ensures that the waveform 303 changes polarity only during the background 311. Such embodiments can reduce noise during the polarity transition, when the plasma current passes through 0 amps and the plasma must be re-ignited.

The control and synchronization of the waveforms discussed in FIGS. 3A through 3E can be performed with the methods and systems described herein. With such variable control methods and waveforms that can be utilized, embodiments of the present invention can provide optimized weld penetration and wetting of the weld bead. Thus, a user can optimize these aspects of a weld joint without an increase risk of arc interference and arc blow.

Figure 5:
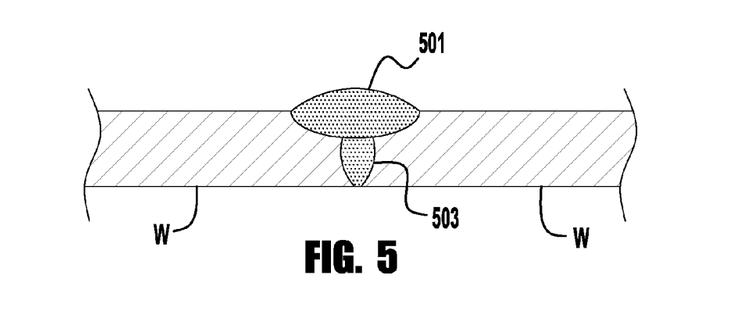
FIG. 5 is a diagrammatical representation of an exemplary weld joint.

FIG. 4 depicts an exemplary embodiment of a welding operation in accordance with an exemplary embodiment of the present invention, which can create a weld joint as shown in FIG. 5. As shown the TIG/plasma torch 115 has an electrode 117 which creates a plasma pulse or TIG arc pulse 405 between its tip and the weld joint WJ created by the work pieces W. The arc or plasma pulse 405 can be utilized in a number of ways. For example, it may be desirable to provide deep penetration into the weld joint WJ while minimizing the width of the penetration. Thus, the arc or plasma pulse 405 can be used to fully penetrate the work pieces W as shown in the weld region 503 in FIG. 5. Alternatively, the TIG/plasma arc can be used to carve out a molten trench in the work piece W to increase the normal penetration of a GMAW system. Such an embodiment would minimize the volume of weld metal that is added to a joint by increasing the penetration of a GMAW welding operation. Additionally, the pulsed plasma or TIG arc 405 can be used to clean the welding surface of the work pieces W from contaminants prior to welding. The work pieces W can have paint or corrosion resistant coatings on their surfaces which would interfere with the welding operation, and thus the plasma/arc 405 can be used to clean these coatings or contaminants off of the work pieces prior to welding. The current for the TIG/plasma pulse 405 can be controlled such that the desired penetration into the weld joint WJ can be achieved. That is, the peak and background current levels for the TIG/plasma waveform can be controlled to achieve the desired penetration. As shown in FIG. 4, following the TIG/plasma arc 405 is the torch 113 which is welding with the filler wire 111. During this welding, droplets 401 of the filler wire 111 are transferred to the weld joint WJ to create the weld bead WB and the portion 501 of the weld shown in FIG. 5. This portion 501 of the weld joint WJ has a shallower and wider cross-section than the portion 503. Such embodiments of the present invention allow the weld joint WJ to have an optimal joint profile, in that the desired weld depth can be attained (in region 503) without excessive heat input in the creation of region 501. Further, this is accomplished without arc blow issues from interfering arcs 403 and 405.

It is noted that although FIGS. 4 and 5 depict an exemplary butt-type joint, embodiments of the present invention are not limited to such an application and can be utilized in many different welding applications. For example, exemplary embodiments of the present invention can be used for seaming long seams on tanks or pipes, creation complete penetration fillet welds for stiffeners, etc., making complete penetration joints joining fins to tubes (making tube sheets), butt joining flat sheet or plate to make larger structures, preheating weld joints, etc. Of course, embodiments of the present invention can be used on other welding applications without departing from the spirit or scope of the present invention.

Figure 6:
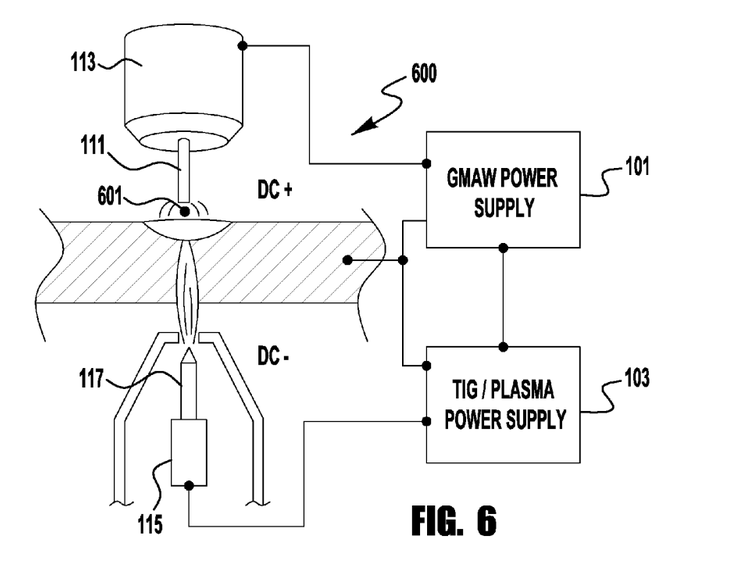
FIG. 6 is a diagrammatical representation of another exemplary welding system and operation in accordance with another embodiment of the present invention.

FIG. 6 depicts another exemplary welding system 600 of the present invention. In this exemplary embodiment, the GMAW torch 113 is positioned on a first side of the weld joint while the TIG/plasma torch 115 is positioned on the opposite side of the weld joint. In this embodiment, the TIG/plasma arc is penetrating the work piece from the bottom of the weld joint while the GMAW welding arc is welding from the top of the weld joint. Again, because the beginning of the pulses, of each of the respective arcs, are out of phase with each other there is minimal arc interference. In the exemplary embodiment shown in FIG. 6, the current waveforms of the respective pulse signals are of the opposite polarity. As shown, the GMAW power supply 101 is welding with a DC+ current welding waveform, while the TIG/plasma power supply 103 is also utilizing a DC current, but it is a DC− current. By utilizing pulse waveforms which are out-of-phase with each other and have opposite polarity, arc interference is minimized. This is because the build up of interfering magnetic fields between the arcs/plasma is eliminated or mitigated.

Figure 7:
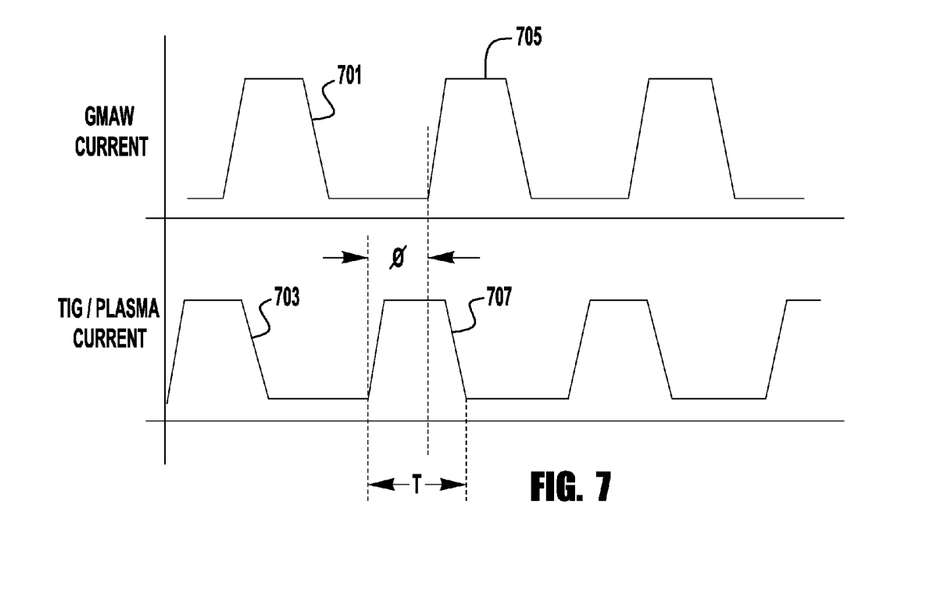
FIG. 7 is a diagrammatical representation of another welding waveform used with embodiments of the present invention.

FIG. 7 depicts another exemplary current waveform for each of the power supply 101 (waveform 701) and from the TIG/plasma power supply 103 (waveform 703). In this embodiment the respective pulses 705 and 707 are out of phase by a phase angle Ø, such that the TIG/plasma pulse 707 begins prior to the pulse 705 so that the TIG/plasma arc cuts through the bottom of the weld joint (as shown in FIG. 6) prior to the droplet transfer occurring from the electrode 111, but the TIG/plasma pulse 707 is ended prior to the droplet 601 releasing from the electrode 111 so that the pulse 707 does not interfere with the flight of the droplet 601 to the weld puddle. Because the power supplies 101 and 103 are operating in opposite polarity (as shown in FIG. 6) the arc interference is minimal and because the TIG/plasma pulse 707 is ended prior to the droplet 601 releasing from the electrode 111 the flight of the droplet is not interfered with. In an exemplary embodiment of the present invention, the phase angle Ø between the beginning of the TIG/plasma pulse 707 and the pulse 705 is in the range of 1 and 359 degrees, and the duration T of the TIG/plasma pulse 707 is such that the pulse 707 is completed prior to the droplet 601 separating from the electrode 111. In other exemplary embodiments of the present invention, the pulses are out of phase by a phase angle in the range of which each other in the range of 45 to 135 degrees. In other exemplary embodiments, the pulses are out of phase by a phase angle in the range of 45 to 90 degrees. It is also noted that in some exemplary embodiments the TIG/plasma waveform should be controlled such that the plasma pressure is sufficient to keep the keyhole in the weld metal from closing up, such that the desired level of penetration is maintained. In exemplary embodiments of the present invention, as depicted in FIGS. 6 and 7, by controlling the phase angle Ø between the pulses the penetration and width of the weld puddle for the GMAW welding can be controlled. Specifically, when the respective currents are controlled such that the peak current flows from the GMAW torch 113, into the work piece, and then into the plasma/TIG torch 115/117, the weld puddle will be narrow, and deeper, as the current flows through to the torch 115. However, when the current from the torch 113 is directed to the coupled ground connection (for example, when both currents are at their respective peaks and are at the same polarity) the weld puddle will become wider, and shallower. Thus, the control of the respective currents can be utilized to control the depth and width of the weld puddle from the GMAW welding operation.

Figure 8:
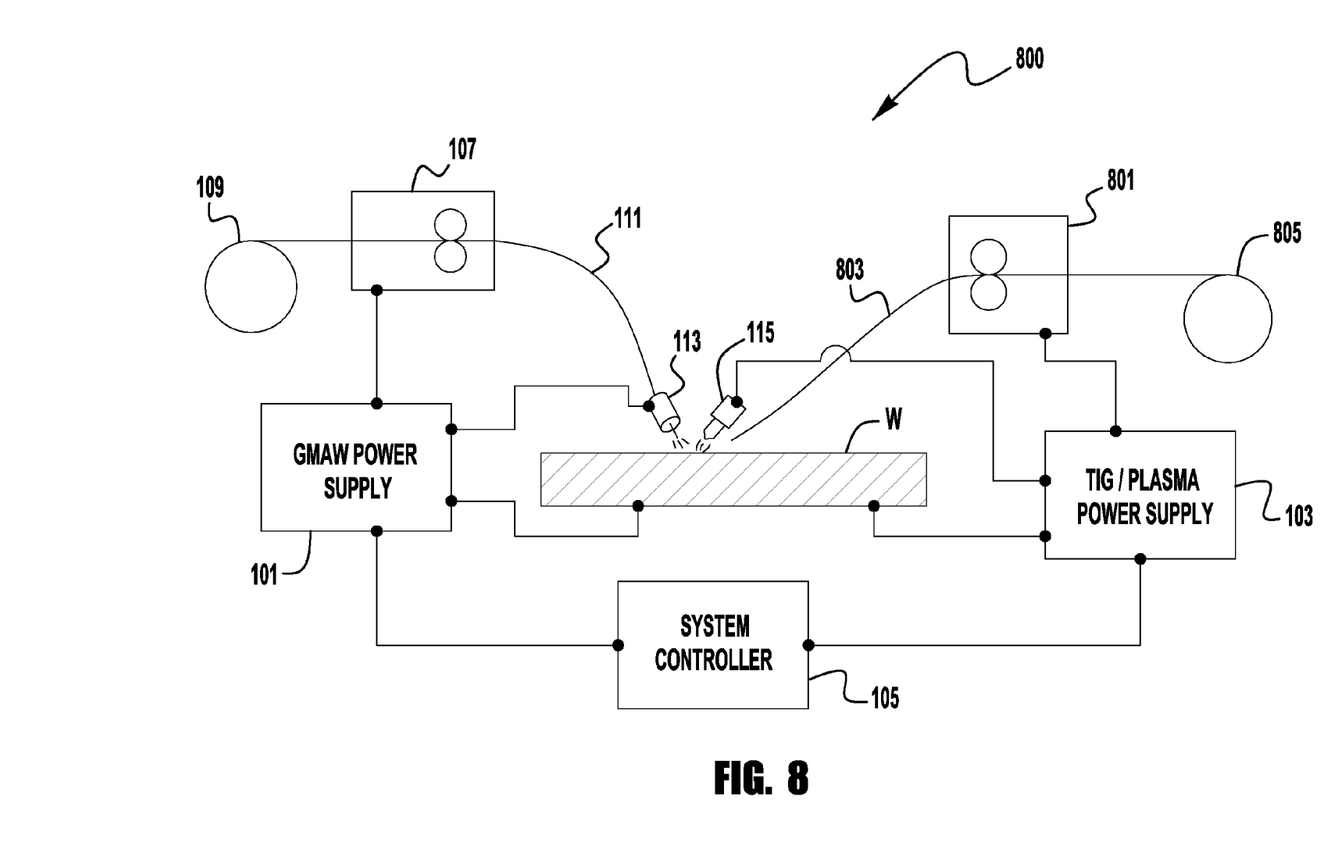
FIG. 8 is a diagrammatical representation of another exemplary embodiment of a welding system of the present invention.

FIG. 8 depicts another exemplary welding system 800 of the present invention. In this system 800, an additional filler wire 803 is provided via an additional wire feeding device 801 coupled to the power supply 103. The filler wire is obtained from a source 805 and is added to the weld puddle on the work piece W via a TIG-type welding process. Such embodiments can be used to increase the amount of filler material being provided to the weld joint and/or quench the temperature in the puddle. In such embodiments, any of the waveforms shown in FIG. 2, 3A-3E or 7 can be utilized. The use of additional filler wire can increase the deposition rate, decrease penetration, or decrease admixture. The cold filler wire can be a cored wire with a desired chemistry or alloy that does not normally transfer across an arc, such as tungsten carbide. However, as explained above the waveforms from each of the power supplies 101/103 should be pulsed as described herein to minimize arc blow or arc interference during the welding operation.

Furthermore, in some exemplary embodiments the system controller 105 can control the feeding of the filler wire 803 such that during some portions of the welding operation the filler wire 803 is being provided while in other portions it is not. For example, during a welding operation it may be desirable or necessary to have more filler material in one portion of the weld than another. Thus, during one stage of the welding operation the electrode 111 is the only filler being consumed (even though the power supply 103 is operating as described herein). However, during another stage of the operation more filler material may be needed (e.g., for a wider weld bead) and at this point the system controller 105 can cause the wire feeding device 801 (either directly or through the power supply 103) to begin feeding the filler 803 to the TIG arc/plasma being generated by the power supply 103. This can greatly increase the amount of filler metal being provided. Then, as needed, the controller 105 can stop the feeding of the additional filler wire 803. Thus, embodiments of the present invention can provide significant system flexibility, while avoiding issues caused by arc blow and arc interference.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding system, comprising:
    a first welding torch having a consumable electrode;
    a second welding torch having a non-consumable electrode;
    a welding power supply connected to said first welding torch which outputs a pulsed welding waveform to melt said consumable electrode into a weld joint and generate a first arc between said consumable electrode and said weld joint, where said pulsed welding waveform has a plurality of peak current portions and a plurality of background current portions; and
    a heat generation power supply connected to said second welding torch which outputs a pulsed heating signal to melt at least a portion of said weld joint and generate a second arc between said non-consumable electrode and said weld joint, where said pulsed heating signal has a plurality of peak current portions;
    wherein at least one of said welding power supply and said heat generation power supply are controlled such that said pulsed heating signal is out-of-phase with said pulsed welding waveform such that no portion of each of said peak current portions of said pulsed heating signal occurs during said peak current portions of said pulsed welding waveform; and
    wherein at least one of said pulsed welding waveform and said pulsed heating signal is an AC signal, and wherein at least one of said welding power supply and said heat generation power supply detects a short circuit between said electrode and said weld joint, and wherein upon detection of said short circuit said heat generation power supply controls said pulsed heating signal to create a short circuit clearing pulse having a peak current to clear said short circuit, and wherein said peak current of said short circuit clearing pulse ends prior to an end of a short circuit clearing pulse initiated by said welding power supply upon detection of said short circuit.

2. The welding system of claim 1, wherein each of said peak current portions of said pulsed heating signal is less in duration than each of said background current portions of said pulsed welding waveform.

3. The welding system of claim 1, wherein each of said pulsed heating signal and said pulsed welding waveform are AC.

4. A welding system, comprising:
a welding power supply which outputs a pulsed welding waveform to melt an electrode into a weld joint, where said pulsed welding waveform has a plurality of peak current portions and a plurality of background current portions; and
a heat generation power supply which outputs a pulsed heating signal to melt at least a portion of said weld joint, where said pulsed heating signal has a plurality of peak current portions;
wherein at least one of said welding power supply and said heat generation power supply are controlled such that said pulsed heating signal is out-of-phase with said pulse welding waveform such that at least a portion of each of said peak current portions of said pulsed heating signal does not occur during said peak current portions of said pulsed welding waveform,
wherein at least one of said welding power supply and said heat generation power supply detects a short circuit between said electrode and said weld joint, and wherein upon detection of said short circuit said heat generation power supply controls said pulsed heating signal to create a short circuit clearing pulse having a peak current to clear said short circuit, and
wherein said peak current of said short circuit clearing pulse ends prior to an end of a short circuit clearing pulse initiated by said welding power supply upon detection of said short circuit.

5. The welding system of claim 1, wherein said heat generation power supply is one of a TIG welding power supply or a plasma generation power supply.

6. The welding system of claim 1, wherein some of said peak current portions of said pulsed heating signal have a first polarity and the other of said peak current portions of said pulsed heating signal have a second polarity, and where said pulsed heating signal is controlled such that said peak current portions with said first polarity overlap at least a portion of each of said background current portions of said pulsed welding waveform.

7. The welding system of claim 1, wherein at least one of said welding power supply and said heat generation power supply are controlled such that said pulsed heating signal is out-of-phase with said pulse welding waveform by a phase angle in the range of 1 to 359 degrees, where said phase angle is measured between a beginning of said peak current portions of said pulsed welding waveform and a beginning of said peak current portions of said pulsed heating signal.

8. A method of welding, comprising:
providing first and second welding torches, where said first welding torch has a consumable electrode and said second welding torch has a non-consumable electrode;
providing a pulsed welding waveform to said consumable electrode to melt said consumable electrode into a weld joint and generate a first arc between said consumable electrode and said welding joint, where said pulsed welding waveform has a plurality of peak current portions and a plurality of background current portions;
providing a pulsed heating signal to melt at least a portion of said weld joint and generate a second arc between said non-consumable electrode and said weld joint, where said pulsed heating signal has a plurality of peak current portions; and
controlling at least one of said pulsed heating signal and said pulsed welding waveform such that no portion of each of said peak current portions of said pulsed heating signal occurs during said peak current portions of said pulsed welding waveform; and
wherein at least one of said pulsed welding waveform and said pulsed heating signal is an AC signal, detecting a short circuit between said electrode and said weld joint, and wherein upon detection of said short circuit creating a short circuit clearing pulse in said pulsed heating signal having a peak current to clear said short circuit; and
initiating a short circuit clearing pulse in said pulsed welding waveform upon detection of said short circuit and wherein said peak current of said short circuit clearing pulse of said pulsed heating signal ends prior to an end of said short circuit clearing pulse in said pulsed welding waveform.

9. The welding method of claim 8, wherein each of said peak current portions of said pulsed heating signal is less in duration than each of said background current portions of said pulsed welding waveform.

10. The welding method of claim 8, wherein each of said pulsed heating signal and said pulsed welding waveform are AC.

11. A method of welding, comprising:
providing a pulsed welding waveform to an electrode to melt said electrode into a weld joint, where said pulsed welding waveform has a plurality of peak current portions and a plurality of background current portions;
providing a pulsed heating signal to melt at least a portion of said weld joint, where said pulsed heating signal has a plurality of peak current portions;
controlling at least one of said pulsed heating signal and said pulsed welding waveform such that at least a portion of each of said peak current portions of said pulsed heating signal does not occur during said peak current portions of said pulsed welding waveform;
detecting a short circuit between said electrode and said weld joint, and wherein upon detection of said short circuit creating a short circuit clearing pulse in said pulsed heating signal having a peak current to clear said short circuit; and
initiating a short circuit clearing pulse in said pulsed welding waveform upon detection of said short circuit and wherein said peak current of said short circuit clearing pulse of said pulsed heating signal ends prior to an end of said short circuit clearing pulse in said pulsed welding waveform.

12. The welding method of claim 8, further comprising creating said pulsed heating signal with one of a plasma power supply or a TIG welding power supply.

13. The welding method of claim 8, wherein some of said peak current portions of said pulsed heating signal have a first polarity and the other of said peak current portions of said pulsed heating signal have a second polarity, and where said pulsed heating signal is controlled such that said peak current portions with said first polarity overlap at least a portion of each of said background current portions of said pulsed welding waveform.

14. The welding method of claim 8, wherein said pulsed heating signal is out-of-phase with said pulse welding waveform by a phase angle in the range of 1 to 359 degrees, where said phase angle is measured between a beginning of said peak current portions of said pulsed welding waveform and a beginning of said peak current portions of said pulsed heating signal.

15. The welding system of claim 1, further comprising a controller coupled to the welding power supply and the heat generation power supply for controlling at least one of said welding power supply and said heat generation power supply such that said pulsed heating signal is out-of-phase with said pulse welding waveform such that at least a portion of each of said peak current portions of said pulsed heating signal does not occur during said peak current portions of said pulsed welding waveform.

16. The welding system of claim 15, wherein the second welding torch is a plasma torch.

17. The welding method of claim 8, further comprising a controller for controlling at least one of said pulsed heating signal and said pulsed welding waveform such that at least a portion of each of said peak current portions of said pulsed heating signal does not occur during said peak current portions of said pulsed welding waveform.

18. The welding method of claim 17, wherein said second welding torch is a plasma torch.

19. The welding system of claim 1, wherein said pulsed welding waveform is a DC signal and said pulsed heating signal is an AC signal.

20. The welding method of claim 8, wherein said pulsed welding waveform is a DC signal and said pulsed heating signal is an AC signal.

* * * * *